US008241160B2

(12) United States Patent  
Jung et al.

(10) Patent No.: US 8,241,160 B2
(45) Date of Patent: Aug. 14, 2012

(54) TRANSMISSION FOR USE IN A MOTOR AND A PEDAL-POWERED VEHICLE AND TRANSMISSION METHOD THEREOF

(75) Inventors: Tae-Jin Jung, Chungcheongbuk-do (KR); Hyuk Yoo, Chungcheongbuk-do (KR); Seong-Cheol An, Chungcheongbuk-do (KR)

(73) Assignee: MBI Co., Ltd, Chungcheongbuk-Do (KR)

( * ) Notice: Subject to any disclaimer, the term of this patent is extended or adjusted under 35 U.S.C. 154(b) by 103 days.

(21) Appl. No.: 12/844,895

(22) Filed: Jul. 28, 2010

(65) Prior Publication Data
US 2012/0028746 A1 Feb. 2, 2012

(51) Int. Cl.
*F16H 3/72* (2006.01)
*F16H 3/44* (2006.01)

(52) U.S. Cl. ................. 475/4; 475/8; 475/297

(58) Field of Classification Search .............. 475/4, 296, 475/340, 210, 212, 213, 269, 297, 149, 150, 475/330; 180/206.4, 206.6; 192/48.92
See application file for complete search history.

(56) References Cited

U.S. PATENT DOCUMENTS

| | | | |
|---|---|---|---|
| 6,263,993 B1 * | 7/2001 | Lin | 180/206.4 |
| 2002/0183159 A1 * | 12/2002 | Okochi | 475/269 |
| 2011/0180341 A1 * | 7/2011 | Chan | 180/206.4 |
| 2012/0083383 A1 * | 4/2012 | Steuer et al. | 475/297 |

* cited by examiner

*Primary Examiner* — Sherry Estremsky
*Assistant Examiner* — Lillian Nguyen
(74) *Attorney, Agent, or Firm* — Ladas & Parry LLP

(57) ABSTRACT

A transmission for use in an electrically-driven bicycle and/or a scooter is disclosed, in which the transmission coupled with a motor is embedded together with the motor in a hub of a rear or front wheel. According to the transmission and a transmission method, the power generated from the motor or a pedal is outputted through a transmission device to a hub shell of the wheel. The output of the motor or other output of the motor which is subject to a reduction unit is used as the input of the transmission device. The ring gear and the hub shell are connected to each other with an output pawl, so that the power cannot be reversely inputted when the hub shell is rotated with a higher speed than the ring gear.

5 Claims, 7 Drawing Sheets

TRANSMISSION FOR USE IN A MOTOR AND A PEDAL-POWERED VEHICLE AND TRANSMISSION METHOD THEREOF

BACKGROUND OF THE INVENTION

1. Field of the Invention

The present invention relates to a transmission embedded in a hub of a bicycle and a transmission method thereof, and more particularly, to a transmission for use in a motor to and a pedal-powered vehicle and a transmission method thereof, which may be commonly applied to an electrically-driven bicycle or a scooter in which a motor is embedded or a conventional pedaling bicycle.

2. Description of the Related Art

Conventionally, a bicycle is means for transport in which pedals are driven by at least one human power to rotate wheels so that it may be moved forward.

Such a bicycle has been developed to be electrically-driven by a motor instead of the human power.

In the electrically-driven bicycle, an accelerator may be manipulated to control the rotary power of the motor so that the speed of the bicycle may be controlled from a lower speed to a higher speed. The electrically-driven bicycle driven by the accelerator as described above has been referred to as a scooter-type electrically-driven bicycle.

Further, there is a pedal-assistant-type or PAS-type electrically-driven bicycle in which the rolling motion of the pedal is automatically sensed so that a motor may be rotated depending the sensed rolling motion of the pedal.

Like the conventional motor, if the rotational speed is lowered, the efficiency of a hub-type motor in which a motor is embedded in a hub is rapidly dropped, so that the driving capability of the electrically-driven bicycle or the scooter may be reduced. Accordingly, the bicycle or the scooter is required to have a transmission in order to enhance the driving force in a lower speed. The hub-type motor in which a transmission as well as a motor is embedded in the hub has been recently developed.

In such a transmission, only the input of the motor is generally gear shifted, and there is a disadvantage in that the gear shift cannot be executed if a transmission control unit is loaded while the bicycle is moved under the driving condition of the motor or the pedal.

There is another problem in that, when the input of the motor and the input of the pedal is introduced into a single transmission, it is not easy to convert these inputs to a required transmission stage during the driving condition of the motor or the pedal.

SUMMARY OF THE INVENTION

Accordingly, the present invention is conceived to solve the aforementioned problems in the prior art. An object of the present invention is to provide a transmission and a transmission method thereof, which may be applied to a hub-embedded transmission of an electrically-driven bicycle or a scooter.

According to an aspect of the present invention for achieving the objects, there is provided a transmission for use in a motor and a pedal to allow power from a motor and a pedal to be outputted through a transmission device to a hub shell, wherein the transmission device includes:

a carrier having one side meshed with the motor and the other side coupled with a driver, which is connected to the pedal, to be confined only in a one-way rotation manner or in a spline fitting manner; a ring gear producing a gear shift when connected to the carrier, thereby transferring the power to the output hub shell; a first speed pawl mounted in the carrier and directly coupled with the ring gear; a multistage planetary gear mounted in the carrier to accelerate the ring gear; sun gears engaged with the multistage planetary gear and selectively confined to the shaft; and a transmission control unit configured to be selectively confined to the shaft by means of an external speed change lever.

Herein, the motor and the carrier may be connected to each other by means of a reduction planetary gear to give any reduction ratio thereto.

Further, the ring gear and the hub shell are connected to each other by means of an output pawl, so that the power cannot be reversely inputted when the hub shell is rotated with a higher speed than the ring gear.

Still further, the transmission control unit includes:

the second and third speed pawls for selectively confining the second and third speed sun gears which are meshed with an inside of the multistage planetary gear; a pawl control ring, mounted on the shaft adjacent to the second speed pawl and the third speed pawl, for controlling the second speed pawl and the third speed pawl to be selectively pressed, the pawl control ring being elastically connected to the speed change lever in one-way manner; the slide ring arranged next to the pawl control ring in order to cause an extension piece protruding on the other side of the pawl control ring to pass through a gap groove in an inside of the slide ring; and a compulsory return pawl mounted on an interior surface of the driver to extend toward the pawl control ring and an outer peripheral surface of the slide ring, wherein a ratchet groove confined to the compulsory return pawl is formed in an outer peripheral surface of the pawl control ring, and a slide groove, formed in front of the ratchet groove, for allowing the compulsory return pawl to be selectively idle is formed on the outer peripheral surface of the slide ring.

Further, a rotary ring into which the extension piece is inserted and fixed and which is integrally rotated together with the pawl control ring is arranged by means of a second return spring; a transfer ring to which rotary power is transferred by the speed change lever is arranged next to an inside of the rotary ring by a first return spring; and a second arm extending to cause the rotary ring and the slide ring to be rotated only in a one-way direction is formed on the transfer ring.

At this time, ratchet teeth, which are meshed with the pawls assembled onto the shaft, are formed on the insides of the second and third speed sun gears, while contact supports, which cause the second and third speed sun gears to be supported onto the shaft in sliding and rolling manner, are formed on the other sides of the second and third speed sun gears, wherein the interior surfaces of the contact supports, which extend further axially downwards than those of the ratchet teeth, are integrally formed, so that a series of gears may be supported onto and rotated around the shaft in a contact manner without being rattled. Further, only some portions of the shaft, onto which locking and control portions of each pawl required to erect the pawl are assembled, are broadly cut, while other portions of the shaft, onto which a thin extension portion is assembled, are opened only to the extent that the thin extension portion may be seated to be rotated, so that the remaining circumferential portions of the shaft may maintain to be circular, thereby facilitating the sliding and rolling support against guide portions of the sun gears.

Further, when the second speed pawl and the third speed pawl rest on the shaft, the motion of the second speed pawl and the third speed pawl is restrained by the shape of a pawl seat of the shaft, so that the second speed pawl and the third speed pawl are rotated with a predetermined angle with respect to a rotational center in the pawl seat of the shaft to which these pawls and are erected or reclined, or the second speed pawl and the third speed pawl are restrained to be inserted only in an axial direction of the rotational shaft to be prevented from being separated in a direction perpendicular to the rotational shaft, whereby the second speed pawl and the third speed pawl are configured to be stably seated with the rattling between the shaft and these pawls reduced.

According to another aspect of the present invention, there is provided a transmission method for use in motor and pedal, wherein both a motor and a transmission device are provided in a hub shell of a wheel, wherein the power obtained by the motor embedded in the hub shell and the power inputted to a sprocket additionally mounted to an outside of the hub shell and driven by the pedaling of a rider are separately or simultaneously gear shifted by the transmission device embedded in the hub shell.

Here, a compulsory return means is provided so that the gear shift is easily executed even under the driving state by means of the driving force of the motor or the rider, whereby the driving force of the motor or the rider causes the gear shift to be separately or simultaneously controlled in a compulsory manner.

BRIEF DESCRIPTION OF THE DRAWINGS

The above and other objects, features and advantages of the present invention will become apparent from the following description of a preferred embodiment given in conjunction with the accompanying drawings, in which.

DESCRIPTION OF THE PREFERRED EMBODIMENT

Hereinafter, a preferred embodiment of a transmission according to the present invention will be described in detail with reference to the accompanying drawings.

Figure 1:
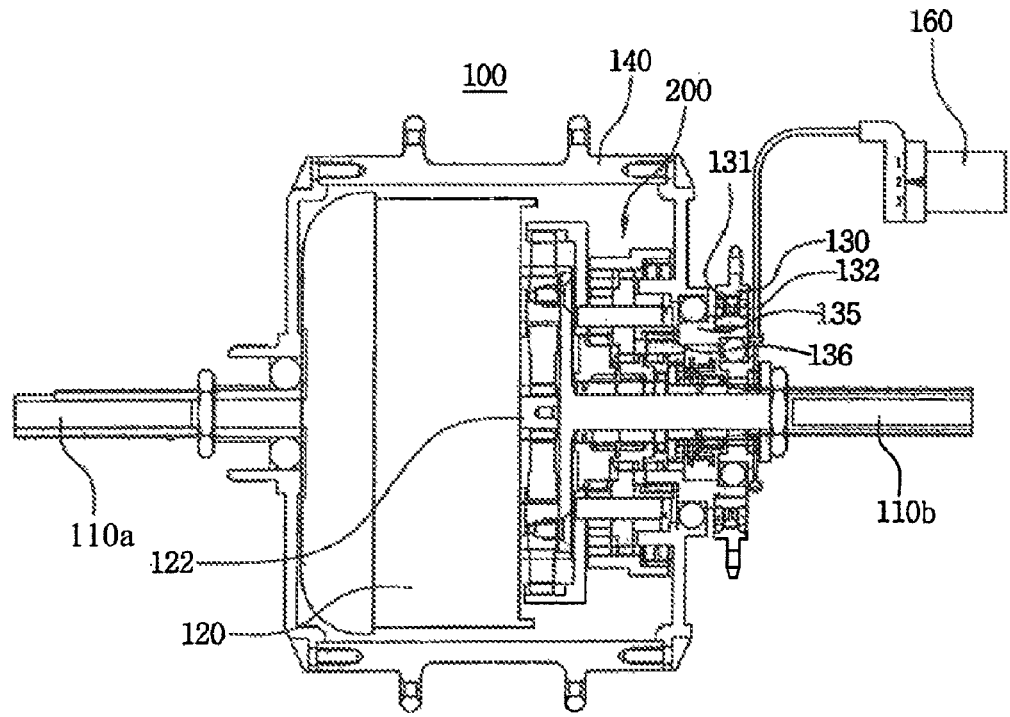
FIG. 1 is a sectional view illustrating a scooter-type transmission according to the present invention.

FIG. 1 is a sectional view illustrating a scooter-type transmission according to the present invention, which uses a sprocket 130 in which a free wheel, i.e., a one-way clutch 132, is prepared.

Figure 2:
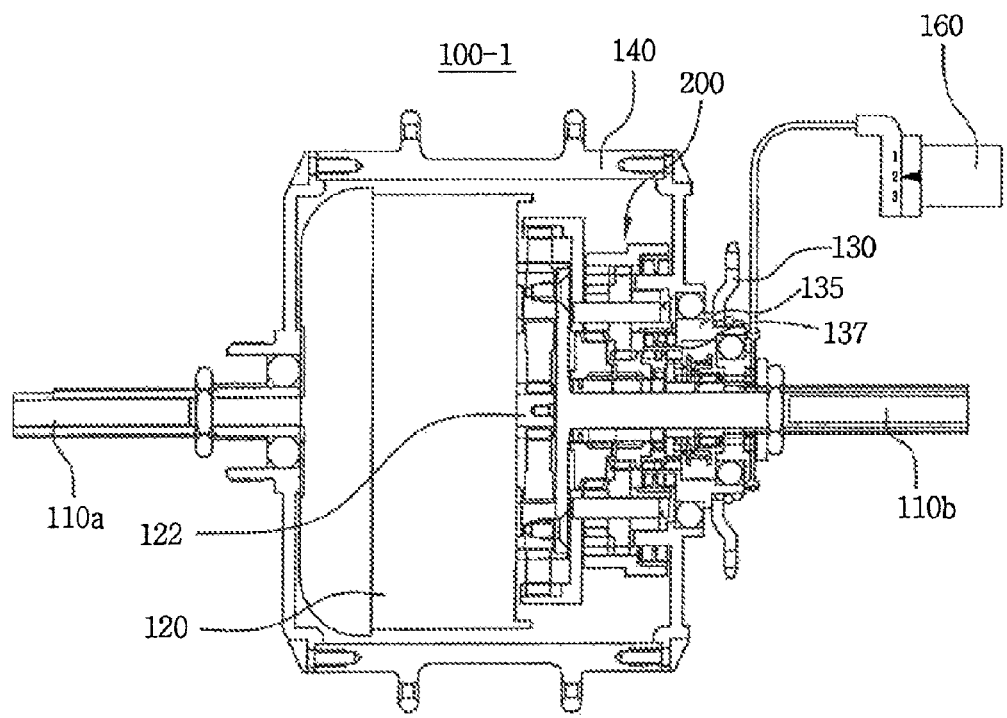
FIG. 2 is a sectional view illustrating a PAS-type transmission according to the present invention.

FIG. 2 is a sectional view illustrating a PAS-type transmission according to the present invention, in which the sprocket 130 is coupled in a conventional manner by forming a spline fitting groove in a portion which otherwise would be coupled with the free wheel shown in FIG. 1. In this case, in order to prevent the operation of a carrier 210 by a motor 120 from being transferred toward the sprocket 130, a one-way clutch 137 is mounted onto a driver 135.

Herein, since the driver 135 and the carrier 210 are coupled with each other by means of a spline 136 within a transmission 100 shown in FIG. 1, the one-way clutch 132 should be always prepared in the sprocket 130.

FIGS. 1 and 2 are different from each other only in that, when the carrier 210 is rotated by the input of the motor, the driver 135 spline-fittingly coupled with the carrier as shown in FIG. 1 is also rotated, while the driver 135 coupled by means of the one-way clutch 137 as shown in FIG. 2 is not rotated.

As such, FIGS. 1 and 2 will be identically described below based on FIG. 1.

Referring to FIG. 1, if schematically categorized, the transmission 100 according to the present invention includes shafts 110a and 110b, the motor 120, a transmission device 200, an output hub shell 140 and the sprocket 130 to which the driving force of a pedal is inputted by using a chain transfer device.

The shafts 110a and 110b are not rotated but stationary in the transmission 100 according to the present invention, while the motor 120 or the sprocket 130 in the transmission 100 is rotated so that the power generated by this rotation may be outputted through the transmission device 200 to the hub shell 140 with which a wheel is coupled.

As such, the motor 120 is fixed to the shaft 110a. Further, one side input of the transmission device 200 is connected to a rotary shaft 122 of the motor 120, while the other side input of the transmission device 200 is connected to the driver 135. The hub shell 140 is coupled with the output of the transmission device 200 and the shaft 110a.

It is preferable that the shafts 110a and 110b are separated into two shafts so that one side shaft 110a is coupled with the motor 120 while the other side shaft 110b is coupled with the transmission device 200 and the driver 135. And, the hub shell 140 is rotationally coupled with the one side shaft 110a and the transmission device 200.

Figure 3:
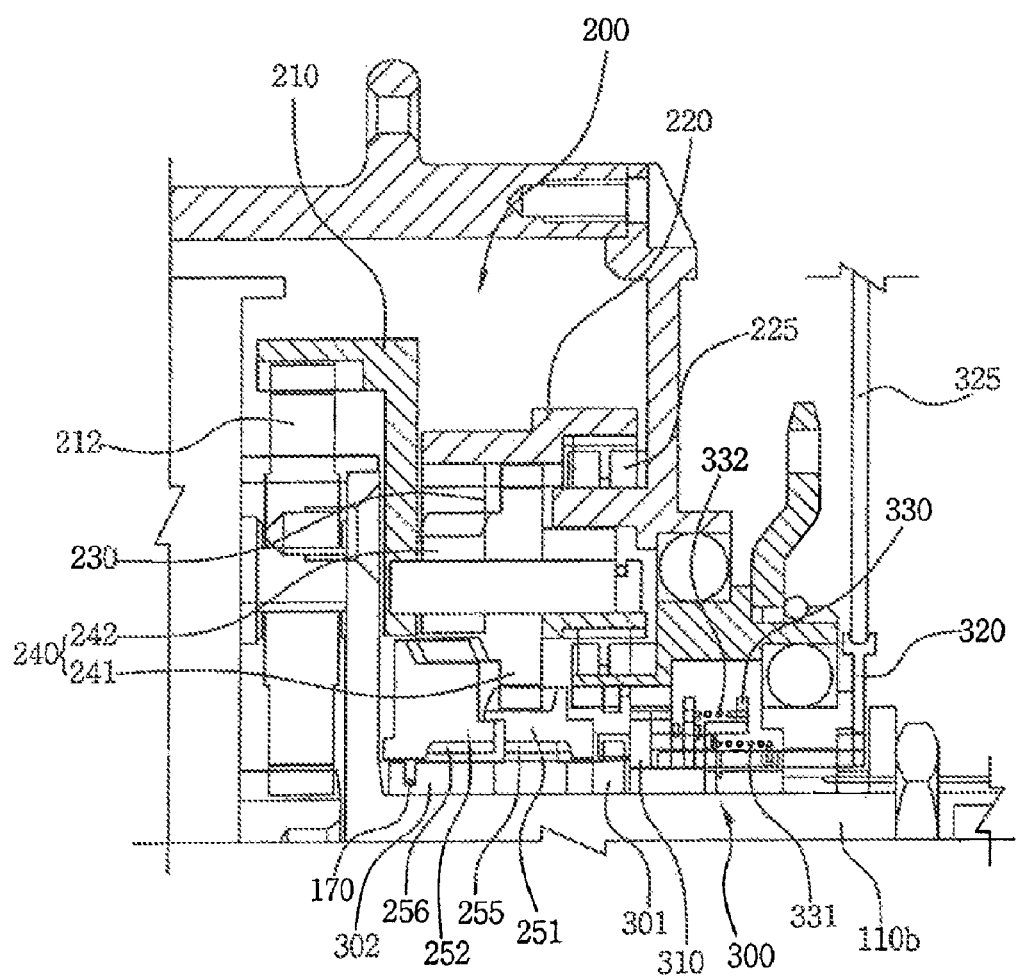
FIG. 3 is an enlarged sectional view illustrating in detail a transmission device shown in FIG. 1.

FIG. 3 is an enlarged sectional view illustrating only an upper portion of the transmission device based on the shafts in order to show a transmission device shown in FIG. 1 in detail.

Firstly, the transmission device 200 has the carrier 210 meshed with the rotary shaft 122 of the motor 120 as shown in FIG. 3. The carrier 210 receives the power of the motor 120 and other power of the driver 135, and a reduction planetary gear 212 may be arranged toward the motor 120 to be connected to the motor 120 in order to give a reduction ratio to the motor 120. That is, if the motor is required to have any reduction ratio depending on the type of the motor, the output of the motor is introduced through the reduction planetary gear 212 to the carrier 210. However, if the motor need not have any reduction ratio, the output of the motor is directly introduced to the carrier 210.

The driver 135, which is integrally coupled with the sprocket 130, is connected to the other side of the carrier 210, which is opposite to the motor 120, by means of the spline 136.

At this time, in the transmission 100-1 as shown in FIG. 2 as described above, the carrier 210 and the driver 135 are connected to each other by means of the one-way clutch (power stop pawl) 137, which would be configured to prevent the power from being transferred from the carrier 210 toward the driver 135. That is, the one-way clutch (power stop pawl) 137 is mounted to be obliquely slanted, so that the power stop pawl 137 is confined only in the oblique direction while the power stop pawl 137 runs idle in the reclined direction.

Next, the carrier 210 which is powered from the motor 120 and the sprocket 130 is connected to a ring gear 220.

The carrier 210 and the ring gear 220 are connected to each other by means of three types, i.e., a first type, by means of a first speed pawl 230, and second and third types, by means of a multistage planetary gear 240.

The first speed pawl 230 causes the carrier 210 and the ring gear 220 to be directly connected to each other, so that the carrier 210 and the ring gear 220 are connected to 1:1 ratio without any acceleration ratio.

In the multistage planetary gear 240, a second speed planetary gear 241 having a larger number of teeth and a third speed planetary gear 242 having a smaller number of teeth are formed in the single planetary gear. The multistage planetary gear 240 is meshed with an interior surface of the ring gear 220 to accelerate the power. Undoubtedly, it will be natural that an inscribed gear, to which the first speed pawl 230 is confined and with which the second speed planetary gear 241 or the third speed planetary gear 242 is meshed, is formed on the interior surface of the ring gear 220.

Herein, a second speed sun gear 251 and a third speed sun gear 252 are meshed with insides of the second speed planetary gear 241 and the third speed planetary gear 242 of the multistage planetary gear 240, respectively. The second speed sun gear 251 and the third speed sun gear 252 are allowed to be confined while a second speed pawl 301 and a third speed pawl 302 mounted on the shaft 110*b* are selectively erected or reclined.

The second speed pawl 301 and the third speed pawl 302 as described above are common in the art in that an external speed change lever causes a pawl control ring 310 to be rotated, thereby erecting or reclining the second speed pawl 301 and the third speed pawl 302.

Consequently, an output pawl 225 causes the ring gear 220 to be connected to the hub shell 140, so that the rotary power of the ring gear 220 is transferred to the hub shell 140, and therefore the wheel coupled with the hub shell 140 is driven. At this time, the output pawl 225 is also obliquely mounted, so that the output pawl 225 causes only the power from the ring gear 220 to be outputted to the hub shell 140 while the output pawl 225 causes any reverse input from the hub shell 140 to be idle.

According to the configuration of the transmission device 200 as described above, the power input from the motor 120 or the sprocket 130 is gear shifted through the carrier 210 by means of the first speed pawl 230 or the multistage planetary gear 240 to be outputted to the ring gear 220 and the hub shell 140.

At this time, since the ring gear 220 is more quickly rotated when the second speed planetary gear 241 or the third speed planetary gear 242 is connected, the first speed pawl 230 runs idle without being interrupted.

Further, even if both the second speed pawl 301 and the third speed pawl 302 are erected to be confined, the difference in the speed ratio connected by the third speed pawl 302, i.e., the third speed planetary gear 242 and the second speed planetary gear 241, may cause the second speed sun gear 251 to be rotated in a direction along which the second speed sun gear 251 is not interrupted by the second speed pawl 301, thereby neutralizing the function of the second speed pawl 301. This means that the transmission is consequently subject to the third speed state whether only the third speed pawl 302 is erected or both the third speed pawl 302 and the second speed pawl 301 are erected, thereby resulting in the same effects.

Hereinafter, a transmission control unit 300 for controlling the second speed pawl 301 and the third speed pawl 302 will be described.

Although the second speed pawl 301 and the third speed pawl 302 are controlled by the pawl control ring 310 connected to and rotated by the speed change lever as described above, the second speed pawl 301 and the third speed pawl 302 may not be restrained under a state in which the second speed pawl 301 and the third speed pawl 302 are strongly locked to ratchets 255 and 256 formed on interior surfaces of the second speed sun gear 251 and the third speed sun gear 252. As such, a specific configuration has been prepared to resolve this problem.

Basically, in the transmission control unit 300, a lever ring 320 connected to a speed change lever 160 by means of a wire 325 is coupled onto the shaft 110*b*, so that the lever ring 320 is rotated with a predetermined angle. The rotation is transferred to the pawl control ring 310 positioned on the same shaft, so that the pawl control ring 310 is rotated within a predetermined angle and allows the second speed pawl 301 and the third speed pawl 302 mounted on the same shaft to be erected or reclined. This may be realized since these pawls are elastically pressed by a pawl spring 170 so that these pawls may be elastically erected to be locked with the ratchet 255 and 256 when these pawls are not pressed by the pawl control ring 310.

That is, for example, the basic position of the pawl control ring 310 corresponds to a state in which the pawl control ring 310 causes the second speed pawl 301 and the third speed pawl 302 to be pressed and reclined. When the lever ring 320 is rotated in the one-way direction, the pawl control ring 310 is also rotated, so that the second speed pawl 301 is released from the pressing thereof to be erected. If the lever ring 320 is more rotated in the one-way direction so that the pawl control ring 310 runs to be continuously rotated, the third speed pawl 302 as well as the second speed pawl 301 is released from the pressing thereof so that they turn to be erected.

In order that the transmission control unit 300 is returned to the first speed mode or lowered toward the second speed mode by one stage, the lever ring 320 should be returned. For this, a spring fixing ring 330 is fixedly coupled with the shaft 110*b* between the lever ring 320 and the pawl control ring 310, and return springs 331 and 332 at both sides of the spring fixing ring 330 are connected to the lever ring 320 and the pawl control ring 310, respectively. That is, the above return process may be realized by returning the lever ring 320 by means of the first return spring 331 and by returning the pawl control ring 310 by the second return spring 332.

However, if the transmission control unit 300 is configured with the basic configuration as described above, the second speed pawl 301 and the third speed pawl 302 cannot be pressed by using only the resilient force of the second return spring 332 when the second speed pawl 301 and the third speed pawl 302 are strongly confined to the ratchets 255 and 256 of the second speed sun gear 251 and the third speed sun gear 252, respectively. As such, problems of inconvenience in the gear shift may arise.

That is, since the rotary power of the sprocket 130 as well as the rotary power of the motor 120 is transferred to the transmission device 200 according to the present invention, the second speed pawl 301 and the third speed pawl 302 may be strongly forced into the second speed sun gear 251 and the third speed sun gear 252 even if a bicycle runs on flat ground.

In this case, the second speed pawl 301 and the third speed pawl 302 may be released only if they are pressed with a larger force.

Accordingly, even if the second return spring 332 has been returned, a scheme for compulsorily returning the pawl control ring 310 should be prepared to resolve a case in which the pawl control ring 310 is not returned.

Figure 4:
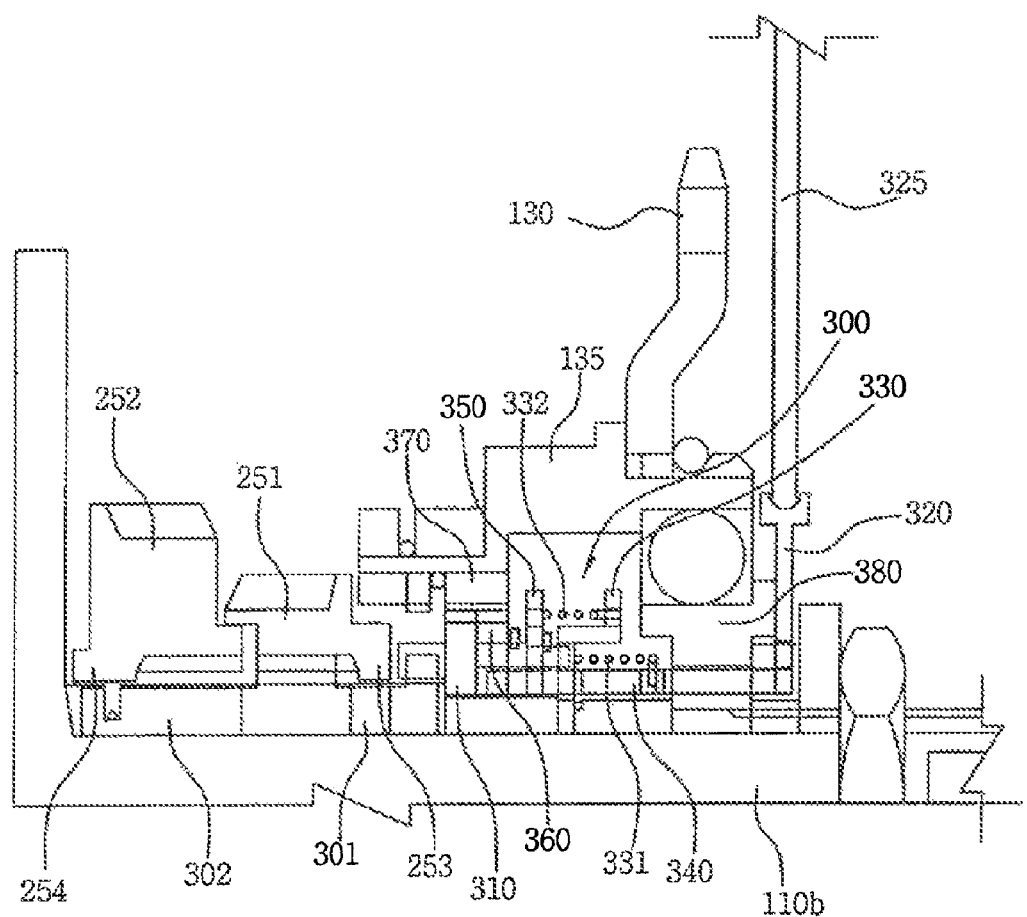
FIG. 4 is an enlarged sectional view illustrating in detail a transmission control unit shown in FIG. 3.
Figure 5:
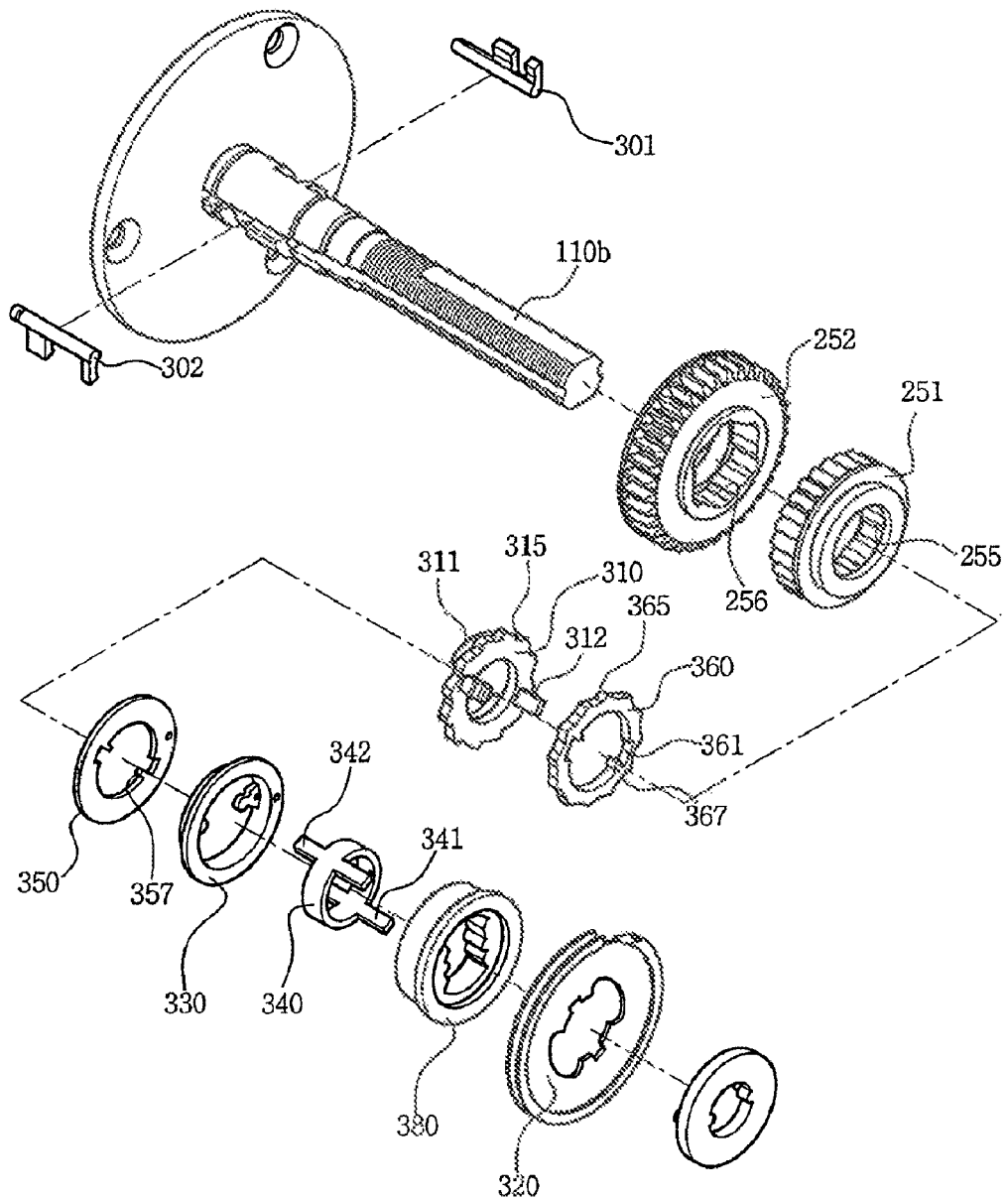
FIG. 5 is an exploded perspective view illustrating the transmission control unit shown in FIG. 3 in an exploded manner.

FIG. 4 is an enlarged sectional view illustrating in detail the transmission control unit shown in FIG. 3; FIG. 5 is an exploded perspective view illustrating only the transmission control unit shown in FIG. 3 in an exploded manner; and FIG. 6 is an exploded perspective view illustrating the transmission control unit in a partially coupled manner.

Figure 6:
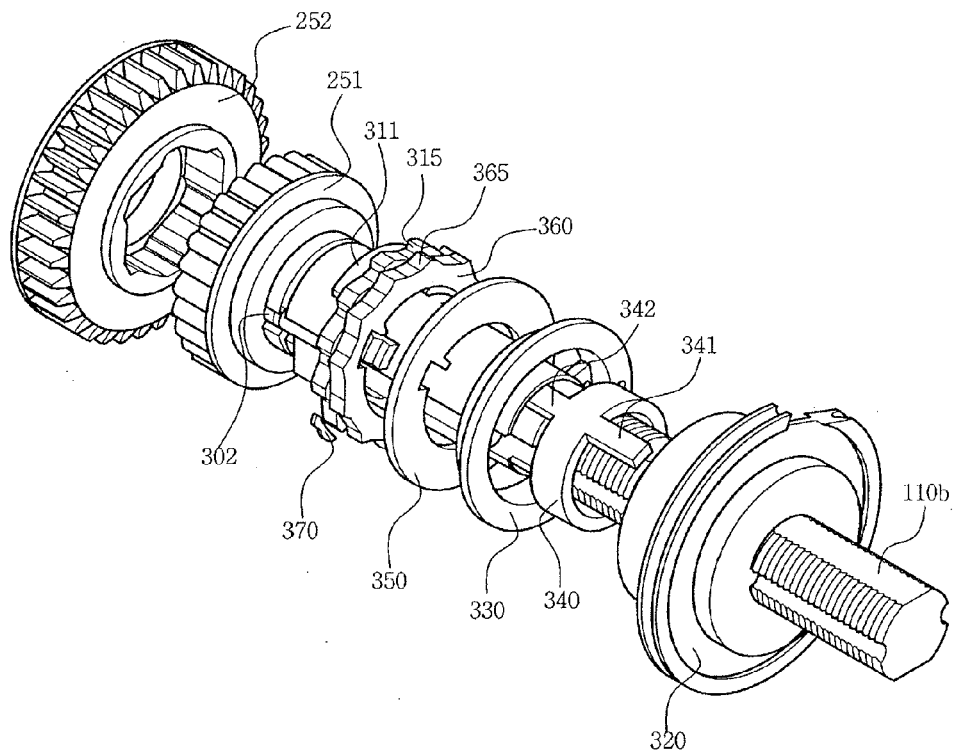
FIG. 6 is an exploded perspective view illustrating the transmission control unit shown in FIG. 3 in a partially exploded manner.

As shown in FIGS. 4 to 6, a compulsory return means according to the present invention may be realized by arranging a slide ring 360 next to the pawl control ring 310 and by mounting a compulsory return pawl 370, which is in contact with outer peripheral surfaces of the slide ring 360 and the pawl control ring 310, to be connected to an inside of the driver 135.

That is, the driver 135 is rotated by means of the motor 120 or the sprocket 130, and this rotary power is compulsorily transferred to the pawl control ring 310 by means of the compulsory return pawl 370.

At this time, a ratchet groove 315 for confining the compulsory return pawl 370 is formed in the outer peripheral surface of the pawl control ring 310, while a slide groove 365 which is too smoothly crooked to confine the compulsory return pawl 370 is formed in the outer peripheral surface of the slide ring 360. And, when a locking projection 357 of a rotary ring 350 and a locking projection 367 of the slide ring 360 are lined up in a row by means of a first arm 341 of a transfer ring 340, the slide groove 365 is positioned in front of the ratchet groove 315 of the pawl control ring 310, so that the compulsory return pawl 370 is set to be slid along the slide groove 365 without being confined to the ratchet groove 315 of the pawl control ring 310, wherein the rotary ring 350 and the slide ring 360 are coupled with the pawl control ring 310 to be integrally rotated therewith.

As such, in the normal condition, the compulsory return pawl 370 is idle on the slide groove 365 with which the compulsory return pawl 370 is initially in contact. However, in case the second speed pawl 301 and the third speed pawl 302 are loaded, the slide ring 360 is rotated by a space between a gap groove 361 therein and an extension piece 312 on the pawl control ring 310, so that the slide groove 365 is located behind the ratchet groove 315 of the pawl control ring 310. Consequently, the compulsory return pawl 370 is confined to the pawl control ring 310, so that the driving force of the motor or the pedal is transferred to the pawl control ring 310, thereby compulsorily controlling the second speed pawl 301 and the third speed pawl 302.

If that is the case, the configuration should be examined with which the slide ring 360, which otherwise would be in front of the ratchet groove 315 of the pawl control ring 310, turns to be rotated behind the ratchet groove 315 when an abnormal state is sensed. In the abnormal state, the pawl will not be reclined by means of a pressing piece 311 in case the second speed pawl 301 and the third speed pawl 302 are loaded so that the pawl control ring 310 is operated by using only the resilient force of the return springs.

The pressing piece 311 for pressing the second speed pawl 301 or the third speed pawl 302 is formed on one side surface of the pawl control ring 310. A second speed pressing piece 311a for selectively pressing the second speed pawl 301 and a third speed pressing piece 311b for selectively pressing the third speed pawl 302 are alternately formed. The extension piece 312 protrudes on the other side surface of the pawl control ring 310.

The gap groove 361 is formed in an inside of the slide ring 360, wherein the gap groove 361 is grooved in order that the extension piece 312 passes through the gap groove 361 having a predetermined rotational gap with respect to the extension piece 312. At this time, the gap groove 361 is configured to be wider than the width of the extension piece 312. Further, when the pawl control ring 310 is in contact with the second speed pawl 301 or the third speed pawl 302 in a rotational direction along which the pressing piece 311 is separated from the second speed pawl 301 or the third speed pawl 302 to erect the second speed pawl 301 or the third speed pawl 302 in order that the pawl control ring 310 controls the second speed pawl 301 or the third speed pawl 302, the position of the gap groove 361 is determined to cause the slide groove 365 of the slide ring 360 to be positioned in front of the ratchet groove 315 of the pawl control ring 310 in order that the compulsory return pawl 370 cannot be confined to the ratchet groove 315 of the pawl control ring 310.

Further, the rotary ring 350 into which an end portion of the extension piece 312 is inserted to substantially rotate the pawl control ring 310 is prepared next to the slide ring 360, and the spring fixing ring 330 to which the slide ring 360 is connected by means of the second return spring 332 is prepared next to the slide ring 360.

At this time, the transfer ring 340 for rotating the rotary ring 350 and the slide ring 360 only in the rotational direction, i.e., only in the one-way direction, along which the pressing piece 311 is separated from the pawls 301 and 302 to erect the second speed pawl 301 or the third speed pawl 302 in order that the pawl control ring 310 controls the second speed pawl 301 or the third speed pawl 302 is mounted between the inside shaft 110b and each of the rotary ring 350, the spring fixing ring 330 and the slide ring 360.

It is preferable that the transfer ring 340 is connected to the spring fixing ring 330 by means of the first return spring 331, and the first arm 341 and a second arm 342 are configured to integrally protrude from both sides of the transfer ring 340. As such, the first arm 341 is coupled with the lever ring 320 connected to the speed change lever by means of the wire 325 so that the first arm 341 is rotated, while the second arm 342 extends to be simultaneously in contact only in the one-way direction with both the locking projection 357 protruding in the rotary ring 350 and the locking projection 367 protruding in the slide ring 360.

A right-side shaft bearing support 380 is fixed to the shaft and coupled with the driver 135 by means of a bearing to support the driver 135.

The compulsorily return operation of the pawl control ring 310 as constructed above will be described below.

Figure 7:
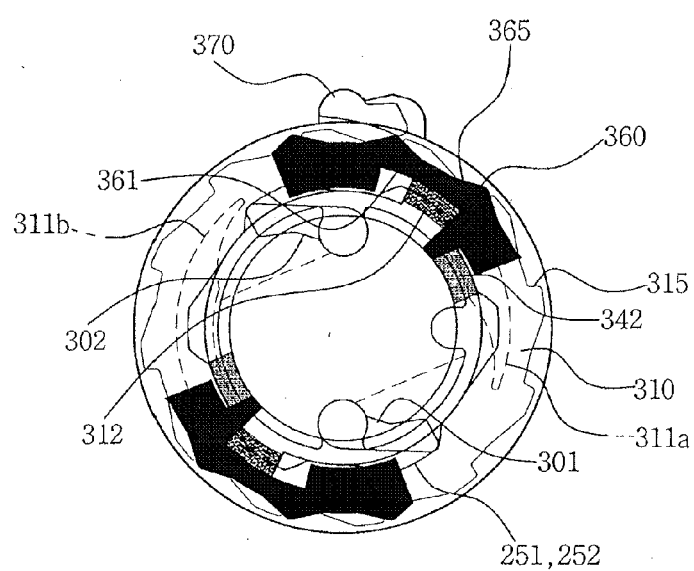
FIG. 7 is a side view showing a state in a third speed mode of the transmission control unit according to the present invention.
Figure 8:
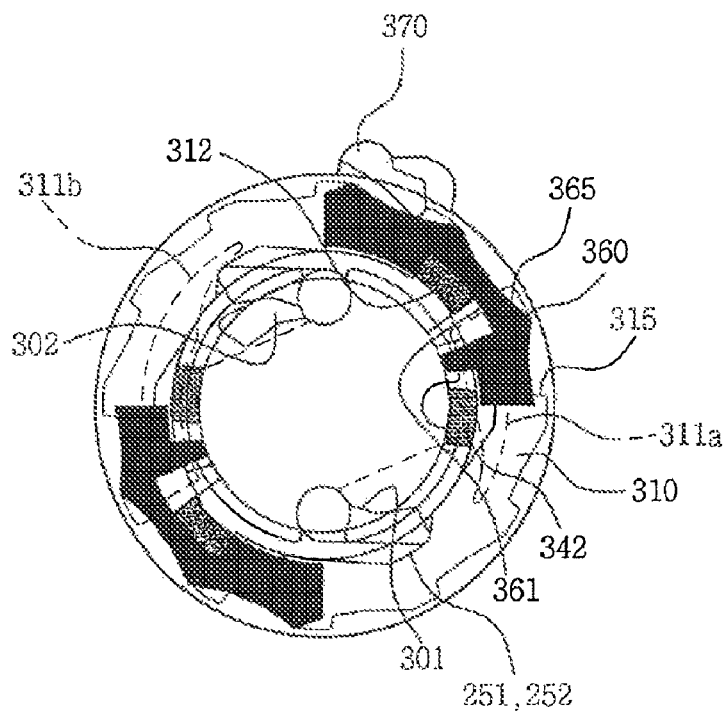
FIGS. 8 and 9 are views showing states in which the transmission control unit is being compulsorily returned from the third speed mode shown in FIG. 7.
Figure 9:
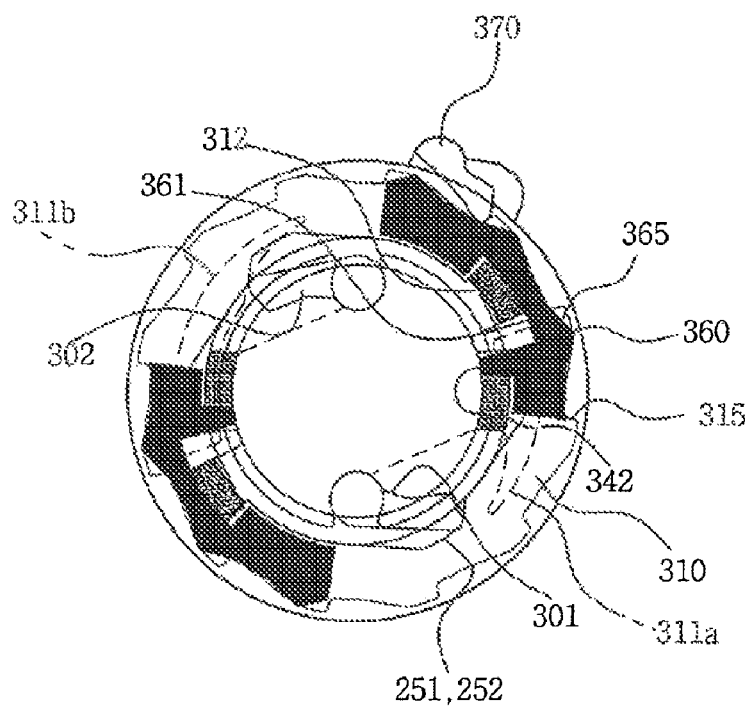
Figure 10:
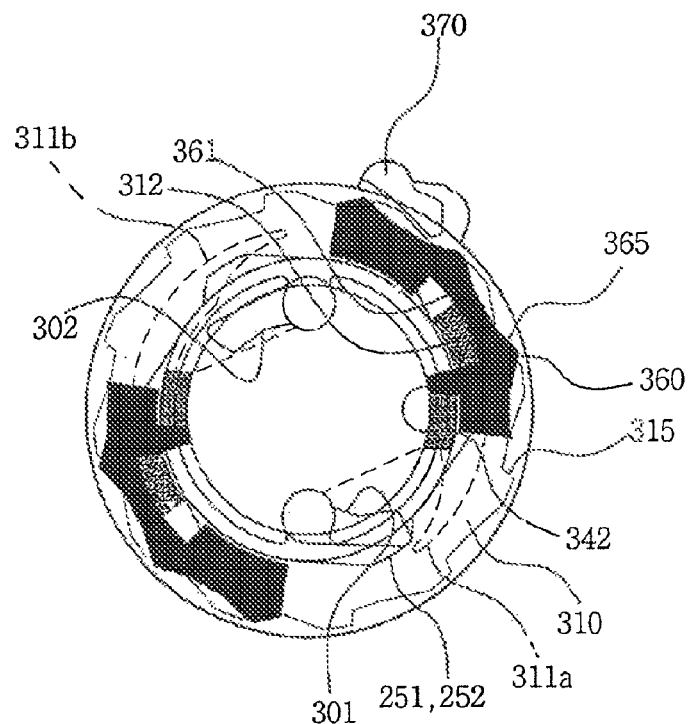
FIG. 10 is a view showing a state in a second speed mode of the transmission control unit after the transmission control unit has been compulsorily returned.
Figure 11:
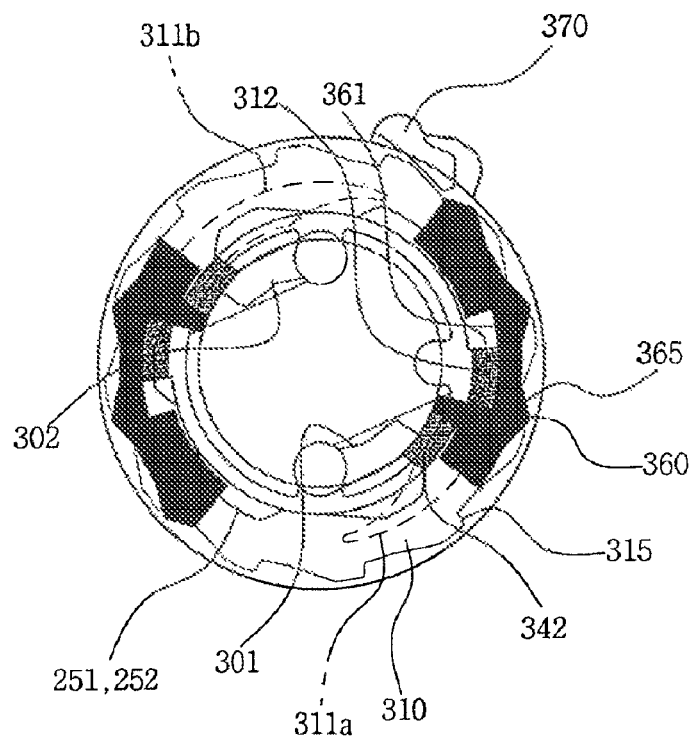
FIG. 11 is a view showing a state in a first speed mode of the transmission control unit.

FIG. 7 is a side view showing a state in a third speed mode of the transmission control unit according to the present invention; FIGS. 8 and 9 are views showing states in which the transmission control unit is being compulsorily returned from the third speed mode shown in FIG. 7; and FIG. 10 is a view showing a state in a second speed mode of the transmission control unit after the transmission control unit has been compulsorily returned.

As shown in FIGS. 6 and 7, when the speed change lever is operated to pull the wire, the lever ring 320 suspended to the wire is rotated, and then the transfer ring 340 which is fitted to and coupled with the lever ring 320 is rotated. The rotation of the transfer ring 340 causes the rotary ring 350 and the slide ring 360 to be rotated by means of the second arm 342. At this time, since the first return spring 331 is tensioned when the transfer ring 340 is rotated, the resilient force of the transfer ring 340 is generated. Further, since the second return spring 332 is tensioned when the rotary ring 350 is rotated, the resilient force of the rotary ring 350 is generated.

This rotation of the rotary ring 350 causes the pawl control ring 310 to be rotated by means of the extension piece 312 fitted to and coupled with the rotary ring 350, so that the second speed pressing piece 311a formed on the one side surface of the pawl control ring 310 causes the second speed pawl 301 to be free. As such, since the second speed pawl 301 is primarily erected by means of the elastic force of the pawl spring 170 so that the second speed pawl 301 confines the second speed sun gear 251 to the shaft, the first speed mode is converted to the second speed mode.

The rotary power of the speed change lever is continually transferred, the pawl control ring 310 is further rotated by using the same method as described in the method in which the first speed mode is converted to the second speed mode, so that the third speed pawl 302 is also erected. That is, the state turns to be shown in FIG. 7, so that this state corresponds to the third speed mode of the transmission device 200.

Hereinafter, since the process in which the third speed mode is converted to the second speed mode and the process in which the second speed mode is converted to the first speed mode are similar with each other, the description will be described based on the state in which the third speed mode is converted to the second speed mode.

As shown in FIGS. 6 and 10, if the speed change lever is operated from the third speed mode to the second speed mode, the wire is loose and the resilient force of the first return spring 331 causes the transfer ring 340, the lever ring 320 and the speed change lever 160 to be restored. Further, the resilient force of the second return spring 332 causes the rotary ring 350 and the pawl control ring 310 to be restored, so that the pressing piece 311 presses the second speed pawl 301 or the third speed pawl 302, thereby being shifted to the second speed mode. That is, the state turns to be shown in FIG. 10, so that this state corresponds to the second speed mode.

Meanwhile, if the second speed pawl 301 in the second speed mode or the third speed pawl 302 in the third speed mode is loaded and confined to the second speed sun gear 251 or the third speed sun gear 252, only the resilient force of the second return spring 332 is too insufficient to allow the pressing piece 311 of the pawl control ring 310 to press the pawls 301 and 302, so that the transmission control toward the required transmission stage cannot be realized (see FIG. 8; reciprocal positions of the third speed pressing piece 311b, the third speed pawl 302 and the ratchet 256 of the third speed sun gear 252).

At this time, as shown in FIGS. 8 and 9, the second arm 342 of the transfer ring 340 is returned to a position related to the second speed state, so that the locking projection 367 of the slide ring 360 and the locking projection 357 of the rotary ring 350 may be free, and therefore returned to a state just before the second return spring 332 causes the third speed pressing piece 311b to be locked to a pressing portion of the extension piece 312. At this time, if the driving force of the motor or the pedal causes the bicycle to run, a locking portion of the third speed pawl 302 is strongly engaged with the ratchet 256 of the third speed sun gear 252 so that the third speed pressing piece 311b of the pawl control ring 310 cannot press the third speed pawl 302, and therefore the next return process of the pawl control ring 310 may be no more realized. However, the locking projection 367 of the slide ring 360, which otherwise would cause the slide groove 365 to be positioned in front of the ratchet groove 315 of the pawl control ring 310, is set to be free, so that the slide groove 365 is further rotated by a gap between the gap groove 361 and the extension piece 312, i.e., by means of the continuous friction of the compulsory return pawl 370 mounted onto the driver 135 which is rotated by the driving force of the motor or the pedal. As such, the slide groove 365 is positioned behind the ratchet groove 315 of the pawl control ring 310, so that the compulsory return pawl 370 is confined to the ratchet groove 315 of the pawl control ring 310.

That is, as shown in FIG. 8, the transfer ring 340 is returned, so that the second arm 342 is separated from the locking projections 357 and 367 in the rotary ring 350 and the slide ring 360. At this time, since the rotary ring 350 is fitted to the extension piece 312 of the pawl control ring 310, the rotary ring 350 cannot be returned together with the pawl control ring 310.

However, as shown in FIG. 9, since the gap groove 361 of the slide ring 360 into which the extension piece 312 of the pawl control ring 310 is inserted is relatively wider, the slide ring 360 is consequently returned by the difference between the width of the extension piece 312 and the width of the gap groove 361. That is, since the slide ring 360 would be locked by locking the second arm 342 of the transfer ring 340 by means of the locking projection 367 of the slide ring 360, the compulsory return pawl 370 was idle while being continuously rubbed. However, since the friction force of the compulsory return pawl 370 is relatively larger when the second arm 342 turns to be absent, the slide ring 360 is allowed to be returned.

Accordingly, as the slide ring 360 is returned and the compulsory return pawl 370 is connected to the ratchet groove 315 of the pawl control ring 310, the driving force of the motor or the pedal is transferred to the pawl control ring 310 by means of the compulsory return pawl 370 mounted onto the driver 135, so that the pawl control ring 310 is compulsorily rotated to the selected transmission stage.

As shown in FIG. 10, if the compulsory return pawl 370 compulsorily continues to rotate the pawl control ring 310 and then encounters the slide ring 360 confined by the second arm 342 positioned to the next transmission stage, the compulsory return pawl 370 is idle again by the slide groove 365, and therefore the pawl control ring 310 continues to be rotated until the locking projection 367 of the slide ring 360 and the locking projection 357 of the rotary ring 350 are lined up in a row to be confined by the second arm 342. At this time, the pressing portion of the third speed pawl 302 is moved from a slanted surface of the third speed pressing piece 311b to an inner surface of the third speed pressing piece 311b, so that there are no more loads to prevent the pawl control ring 310 from being rotated. As such, the pawl control ring 310 is further rotated by means of the resilient force of the second return spring 332.

When the ratchet groove 315 of the pawl control ring 310 is connected to the compulsory return pawl 370 as described above, the driver 135 in the transmission 100 as shown in FIG. 1 is always rotated, so that the compulsory control may be automatically realized. Further, since the rotation of the driver 135 in the transmission 100-1 as shown in FIG. 2 results in the rolling operation of the sprocket 130, the compulsory return may be realized at this time.

Meanwhile, as shown in FIG. 4, contact supports 253 and 254 are formed on the other side of the second speed sun gear 251 and the one side of the third speed sun gear 252, respectively, wherein the contact supports 253 and 254 are in sliding and rolling contact with the shaft, so that the contact supports 253 and 254 cause the second speed sun gear 251 and the third speed sun gear 252 to be stably supported onto the shaft without being rattled up and down or right and left.

Although the transmission as described above has three speed stages, it may be understood that four or two speed stages which are higher or lower than three speed stages may be configured, the same three speed stages may be repeatedly added, four or two speed stages may be repeatedly and easily added together with three speed stages in a mixed manner, or only the transmission may be configured without any motor.

As described above, the transmission and the transmission method according to the present invention enable the input power of the motor and the pedal to be freely converted into a lower speed as well as a higher speed by means of the transmission device.

Further, there is an advantage in that both the input of the motor and the input of the pedal may be received regardless of whether the transmission is under the operation or not.

Further, by transferring both the input of the motor and the input of the pedal, the present invention has resolved another problem that a load would otherwise be generated in the transmission device so that the inputs might not be converted to the selected transmission stage.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

What is claimed is:

1. A transmission for use in a motor and a pedal to allow power from a motor and a sprocket to be outputted to a hub shell through a transmission device,
   wherein the transmission device includes:
   a carrier having one side meshed with the motor and the other side coupled with a driver in a one-way or fitting manner, the driver being connected to the sprocket;
   a ring gear producing a gear shift when connected to the carrier, thereby transferring the power to the output hub shell;
   a first speed pawl mounted in the carrier and directly coupled with the ring gear;
   a multistage planetary gear mounted in the carrier to accelerate the ring gear;
   second and third speed sun gears engaged with the multistage planetary gear and supported by a shaft in a slide contact manner, thereby being selectively confined to the shaft to enable a gear shift;
   a transmission control unit manipulated by an external speed change lever to selectively control a second speed pawl and a third speed pawl; and
   a slide ring for allowing rotary power of the driver to be selectively received in the transmission control unit.

2. The transmission as claimed in claim 1, wherein the transmission control unit includes:
   the second and third speed pawls mounted on the shaft to selectively confine the second and third speed sun gears which are meshed with an inside of the multistage planetary gear;
   a pawl control ring for controlling the second speed pawl and the third speed pawl to be selectively pressed, the pawl control ring being elastically connected to the speed change lever by means of a return spring;
   the slide ring arranged next to a ratchet groove of the pawl control ring to cause an extension piece protruding on the other side of the pawl control ring to pass through a gap groove in an inside of the slide ring; and
   a compulsory return pawl mounted on an interior surface of the driver to extend toward the ratchet groove of the pawl control ring and an outer peripheral surface of the slide ring,
   wherein the ratchet groove confined to the compulsory return pawl is formed in an outer peripheral surface of the pawl control ring, and a slide groove for allowing the compulsory return pawl to be selectively idle is formed in the outer peripheral surface of the slide ring.

3. The transmission as claimed in claim 2, wherein a rotary ring into which the extension piece is inserted is arranged next to the slide ring to be elastically connected to a spring fixing ring by means of a second return spring; a transfer ring to which rotary power is transferred by the speed change lever is arranged next to an inside of the rotary ring to elastically connected to the spring fixing ring by a first return spring; and a second arm extending to cause the rotary ring and the slide ring to be rotated only in a one-way direction is formed on the transfer ring.

4. The transmission as claimed in claim 1, wherein when the second speed pawl and the third speed pawl rest on the shaft, the motion of the second speed pawl and the third speed pawl is restrained by the shape of a pawl seat of the shaft, so that the second speed pawl and the third speed pawl are rotated with a predetermined angle with respect to a rotational center in the pawl seat of the shaft to which these pawls are erected or reclined or the second speed pawl and the third speed pawl are restrained to be inserted only in an axial direction of the rotational shaft to be prevented from being separated in a direction perpendicular to the rotational shaft, whereby the second speed pawl and the third speed pawl are configured to be stably seated with the rattling between the shaft and these pawls reduced.

5. A transmission method for use in a motor and a pedal, wherein both a motor and a transmission device are provided in a hub shell of a wheel, wherein power obtained by the motor embedded in the hub shell and power inputted to a sprocket additionally mounted to an outside of the hub shell and driven by the pedaling of a rider are separately or simultaneously gear shifted by the transmission device embedded in the hub shell, and wherein a compulsory return means is provided so that the gear shift is easily executed even under the driving state by means of the driving force of the motor or the rider, whereby the driving force of the motor or the rider causes the gear shift to be separately or simultaneously controlled in a compulsory manner.

* * * * *